United States Patent [19]
Liu et al.

[11] Patent Number: 6,014,063
[45] Date of Patent: Jan. 11, 2000

[54] METHOD AND APPARATUS FOR REDUCING RADIATED ELECTROMAGNETIC EMISSIONS FROM HARMONIC FREQUENCIES FOR ELECTRONIC EQUIPMENT

[75] Inventors: Dongtai Liu, Fremont; Mohammed A. Safai, Los Altos, both of Calif.

[73] Assignee: Quiet Solutions, Inc., Palo Alto, Calif.

[21] Appl. No.: 08/921,643

[22] Filed: Aug. 27, 1997

[51] Int. Cl.$^7$ ............................. H03B 1/04; H03B 5/00; H03B 5/08; H03B 29/00

[52] U.S. Cl. ................................. 331/78; 331/4; 331/178; 327/157; 327/291; 327/294

[58] Field of Search ................................. 331/1 A, 4, 17, 331/18, 25, 34, 36 C, 45, 67, 68, 78, 143, 158, 178; 327/147–150, 156–159, 164, 291, 293, 294, 298

[56] References Cited

U.S. PATENT DOCUMENTS

| | | | |
|---|---|---|---|
| 5,430,392 | 7/1995 | Matejic | 327/113 |
| 5,491,458 | 2/1996 | McCune, Jr. et al. | 332/144 |
| 5,781,074 | 7/1998 | Nguyen et al. | 331/105 |

*Primary Examiner*—David Mis
*Attorney, Agent, or Firm*—Sierra Patent Group Ltd.

[57] ABSTRACT

A system of spreading the energy of higher harmonic frequencies in digital circuits to lower the interference to bandpass receivers is disclosed. A set of passive, impedance-regulated circuits, preferably housed in a standard enclosure, comprises a power restoring unit, a modulating signal generator, an internal oscillator and an impedance spreading unit. The circuits are equivalent to passive resonators such as crystal resonators used in standard oscillators. Any existing standard oscillator that uses common crystal resonators can be transformed into a spectrum-spread oscillator by replacing the crystal resonator with the disclosed circuit, whereby a tightly controlled small frequency spreading occurs in the fundamental clock frequency. Further an active oscillator is disclosed wherein a spreading circuit spreads the frequency of the clock signal originally generated by the oscillator based on a sequence of processing the original clock signal. The processing includes the use of a plurality of delay elements based on a certain topology, the comparisons between the clock signal and a set of predefine parameters so as to create a frequency offset. The spreading circuit, without using additional clocking sources, spreads the frequency of the clock signal with respect to the comparisons.

23 Claims, 13 Drawing Sheets

METHOD AND APPARATUS FOR REDUCING RADIATED ELECTROMAGNETIC EMISSIONS FROM HARMONIC FREQUENCIES FOR ELECTRONIC EQUIPMENT

BACKGROUND OF THE INVENTION

1. Field of the Invention

The present invention relates to oscillating devices for electronic systems and more particularly relates to implementations of oscillating devices and to improved methods for reducing electromagnetic emissions of harmonic frequencies from electronic systems employing the oscillating devices therein.

2. The Prior Art

Almost every electronic equipment, device, appliance or system in use today uses at least one clocking source to synchronize the operation of all electronic components therein. Progress in computer and electronics technologies has demanded higher clocking frequency for faster operation speed and greater numbers of electronic circuits for more complex functionality. One side effect of the higher clock speeds and additional circuit elements has been increased unwanted electromagnetic emissions at various frequencies, especially at very high frequencies.

A clocking source generally comprises an oscillator circuit for converting a steady and direct current into a given waveform while maintaining the frequency of the waveform within stated limits. For example, sinusoidal oscillators generate sinusoidal waveforms, relaxation oscillators can generate rectangular pulses (square waves) and sawtooth and peaked waveforms. Electromagnetic emission is the transmission of energy in the form of conducted or radiated waves having both an electric and a magnetic component. The sources of electromagnetic radiation are accelerated electrical charges and oscillating currents, which all originate from the clocking source and other electronic components within the system.

It has been known for a long time that excessive electromagnetic emissions from an electronic system may illogically asynchronize operations of nearby electronic systems. Other deleterious effects of electromagnetic radiation have been proved problematic in many areas. Various regulations and organizations have been established to regulate and enforce established standards to control the electromagnetic emissions from the electronic systems. These measures place a tremendous pressure on manufacturers that design and manufacture electronic systems, all must be certified by the regulations before being released to marketplace.

There have been many efforts in the past years to reduce the electromagnetic emissions. One of the common solutions is to shield electronic systems using conductor materials. Other methods include adding radio frequency filters in data paths and employing multiple layered printed circuit boards. However, as the frequency of the clocking source gets higher, these methods become less effective and the cost of the shielding increases considerably. This has motivated a close look at the radiation source comprising the electronic components driven by the clock oscillators, and the clock oscillator itself that fundamentally produces the oscillating frequency.

One of the prior-art efforts is U.S. Pat. No. 5,430,392 to Matejic, which discloses a clock system and method for reducing the electromagnetic emissions of the clock frequency from an electronic system. From the perspective of employing a C.I.S.P.R quasi-peak detector to measure the electromagnetic emissions, Matejic discloses an approach of using a slower signal to vary the frequency of a clocking source over a "broad" frequency range (20% of nominal frequency in the only disclosed example) to spread the emission energy over the frequency range so that the C.I.S.P.R quasi-peak detector does not have enough time to charge at its measured frequency. This lowers the measured emissions from a device using the clock system.

A second example of the efforts of the prior art to reduce EMI from electronic equipment is U.S. Pat. No. 5,426,392 to Kornfeld. To reduce electromagnetic emissions from an electronic system that must be synchronized by a clock source, Kornfeld uses a noise source to add onto a pure frequency signal from a clocking source so as to generate a clocking signal whose phase is modulated by the noise source. With a band-pass filter placed just before the output of the clocking signal, the modulating phase can be tightly controlled and therefore spreads unwanted emissions within a small range surrounding the frequency of the pure clocking signal.

These aforementioned approaches and examples appear to resolve some of the problems of the electromagnetic radiation generated from clocking sources by introducing an additional source to modulate a high frequency clocking signal. However, none have demonstrated practical solutions to or satisfy current systems. For instance, in the Matejic method, a wide swing of the clock frequency is required to deactivate the quasi-peak detector in EMI measurement equipment to result in a lowered measured level. Most electronic equipment, however, would not work properly if the clock frequency were varied over a wide range. Both aforementioned methods have failed to address concerns of compatibility with the most widely used oscillating devices such as crystal resonators where there is no dedicated power input to energize the electronics required for those methods to work. Further these solutions have failed to address concerns of power consumption and physical fitting in aforementioned approaches and examples. There is, thus, a great need for a generic solution to a clocking source that can be used in any conventional electronic system, especially digital electronics systems, with no modifications therein.

Many systems, such as personal computers, are designed to respond to an idle mode in which the system is paused for an excessive period of time. There has been another need for a clocking source to respond to such idle mode so as to stop generating oscillating signals thereby idling the system to reduce the power consumption to a minimum. In order to recondition many electronic systems in use today that may potentially produce excessive electromagnetic radiation therefrom if the original condition thereof changes, there exists another need for a clocking source that is readily able to replace a conventional one and provide an improved clocking signal that would reduce electromagnetic radiation, be compatible with the power-down mode and work correctly as a clock source.

Accordingly, an important object of the present invention is to provide a generic clock generator signal device that will effectively spread the higher harmonic frequencies in electronic system so as to minimize their electromagnetic emissions while providing a usable clock signal to the system.

Another object of the invention is to provide an improved class of devices that is readily available to replace, and compatible in physical fitting and electrical operation to an existing oscillating device or element that would otherwise cause the electromagnetic emissions from a system centralized by the oscillating device.

Still another object of the invention is to have an improved signal device that works with existing oscillating devices to eliminate the potential of causing electromagnetic emissions.

Other objects, together with the forgoing are attained in the exercise of the invention in the following description and resulting in the embodiment illustrated in the accompanying drawings.

BRIEF DESCRIPTION OF THE INVENTION

The present invention has been made in consideration of the above described problems and needs. The improved oscillating devices or circuit elements disclosed herein operate with or without a voltage supplied by an external power. These devices are compatible with most commonly used oscillating devices in the electronic industry: resonators (operating without power supply) and clock oscillators (require power supply). The improved oscillating devices comprise at least a disclosed frequency modulating circuit and can be implemented to operate with an existing oscillating circuit that generates a clocking signal as a source or to self-generate a clocking signal therein. In either case, the clocking signal must have a frequency centered at F such that the modulated clocking signal through the frequency modulating circuit has frequencies spreading within a very small range around F. Unlike a wide-spreading frequency, the frequency power at F not is reduced greatly and the system works properly because of the extremely small variation of F. The higher harmonic frequencies, however, receive a much wider spectrum spreading,, hence their EMI reduced significantly.

BRIEF DESCRIPTION OF THE DRAWING FIGURES

FIGS. 1a and 1b graphic representations of electromagnetic interference for a clocking signal having a fundamental frequency f and the corresponding spread clocking signal.

FIG. 2a is a two-pin passive (non-powered) resonator made of crystal or ceramic elements; FIG. 2b is a three-pin passive resonator made of crystal or ceramic elements and capacitors; and FIG. 2c is a four-pin, active crystal oscillator.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

A closer look at the sources of radiated electromagnetic interference (EMI) in most electronic systems reveals that the clock oscillator is not the major source of EMI. When the clock signal is fed into non-linear components such as integrated circuits, transistors and diodes, etc., a large number of harmonic frequencies are generated. Harmonic frequencies are integer multiples (N=2,3, . . . ) of the fundamental frequency (that is, the clock oscillator frequency).

Most of these harmonic frequencies come from the many transistors inside the integrated circuits that are switched on and off in synchronous pace with the clock pulses. The faster a transistor is turned on and off (that is, shorter rise and fall time of voltage pulses), the higher harmonic frequency it generates. In modern digital electronic equipment employing high speed CMOS circuits, it is not uncommon to find harmonic frequencies with N>100. Since these transistors are "active devices" (meaning they amplify the electrical energy), the harmonic energies generated by the transistors (hence the integrated circuits) can have high magnitude of energy.

Figure 1A:
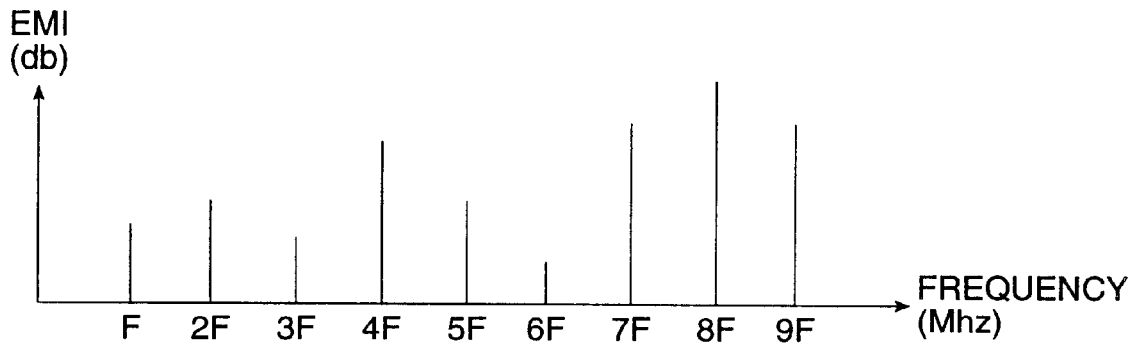

According to the electromagnetic theories, the higher frequencies radiate more efficiently than lower frequencies from a "small" antenna, such as the printed circuit traces and integrated circuits. Harmonic frequencies can be much higher than the fundamental frequency. In typical digital systems the harmonic frequencies are concentrated in discrete frequency points of high strength as graphically illustrated in FIG. 1a. It is the harmonic frequencies that cause most EMI in most practical systems.

Figure 1B:
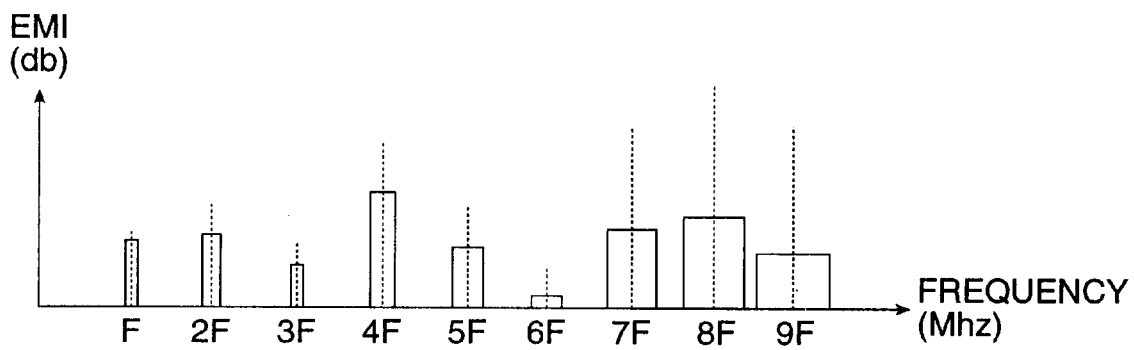

If the harmonic energies are spread evenly over a wide bandwidth that is considerably wider than the bandwidth of EMI interest, the energy within the interested EMI bandwidth will be only a small portion of the total harmonic energy as graphically shown in FIG. 1b. This effectively reduces interference to radio receivers, TV receivers and other equipment. The measured EMI level is also reduced. This is true not only in the "quasi-peak" measurement, where the receiver intentionally delay its response to rapidly changing signal strength, but also in the normal EMI measurement where an EMI bandwidth is specified.

The EMI reduction R (in dB) can be calculated using the following formula, if the following parameters are known: P, the percentage ratio spreading at fundamental frequency; B, the bandwidth of EMI interest; F, the system clock frequency; and N, the harmonic multiple number:

$$R=10*\log_{10}(PNF/50B) \qquad \text{Equation 1}$$

Therefore the required clock frequency spreading percentage can be calculated by:

$$P=\pm(50B/NF)^{R/10}\% \qquad \text{Equation 2}$$

In Table 1, various clock frequency spreading ratios are illustrated for a wide range of harmonic frequencies (=F*N) with B setting at standard EMI measurement bandwidth of 120 kHz.

TABLE 1

Clock Frequency Spreading Required for EMI Reduction

| EMI Reduction (dB) | EMI Harmonic Frequency (MHz) | | | | |
|---|---|---|---|---|---|
| | 50 | 100 | 200 | 500 | 800 |
| −20 | +−12% | +−6% | +−3% | +−1.2% | +−0.72% |
| −15 | +−3.6% | +−1.8% | +−0.09% | +−0.36% | +−0.24% |
| −10 | +−1.2% | +−0.6% | +−0.36% | +−0.12% | +−0.078% |

TABLE 1-continued

Clock Frequency Spreading Required for EMI Reduction

| EMI Reduction (dB) | EMI Harmonic Frequency (MHz) | | | | |
|---|---|---|---|---|---|
| | 50 | 100 | 200 | 500 | 800 |
| −5 | +−0.36% | +−0.18% | +−0.09% | +−0.036% | +−0.024% |
| −3 | +−0.24% | +−0.12% | +−0.06% | +−0.024% | +−0.015% |

Table 1 illustrates the existence of a large number of cases where only very small (<1%) modulation of the clock frequency is required to accomplish the objects of the present invention. According to the present invention, the clock frequency is varied over a narrow range (less than about 3% total frequency spread). This avoids the problems inherent in the prior art wherein large frequency changes are employed.

For example, to illustrate the advantage of the presently disclosed method over prior art methods, consider the case of a serial device such as a computer mouse or a modem connected to the computer via a standard serial port. The timing tolerance of the serial communication protocols is +/−3%. The EMI reduction method disclosed herein works very well in the serial port environment because the narrow clock frequency spreading of less than about +/−1.5%. With prior-art methods such as disclosed in Matejic, however, such serial devices would not work because of the wide clock frequency variation taught therein.

Three preferred embodiments of circuits useful for frequency spectrum spreading are disclosed in detail as follows. These circuits are employed as building blocks for the improved oscillating devices disclosed herein.

Figure 2A:
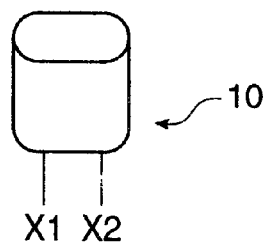
FIGS. 2a through 2c illustrate three common, conventional oscillating devices.
Figure 2B:
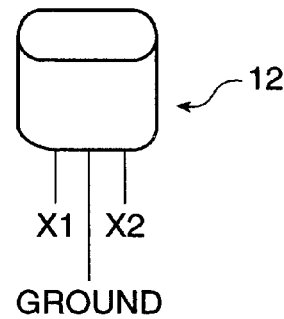
Figure 2C:
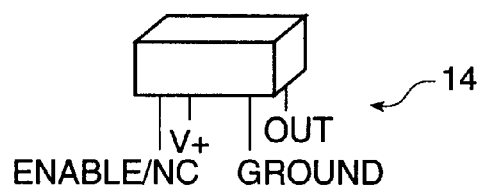

Referring now to FIGS. 2a through 2c, perspective views are shown of three common, conventional prior-art oscillating devices. Referring first to FIG. 2a, two-pin passive resonator 10 has two terminals (leads) X1 and X2. The word "passive" herein refers to the fact that the device is non-powered, and therefore non-functional on its own.

Referring now to FIG. 2b, three-pin passive prior-art resonator 12 has three terminals X1, X2 and ground. A typical clock generator circuit which uses the resonator 12 has three connection nodes, each being connected to each of the leads of the resonator 12, respectively.

Referring now to FIG. 2c, a four-pin prior-art oscillator device 14 is an active component. Unlike the passive resonators 10 and 12 of FIGS. 2a and 2b, respectively, the device 14 is a clock oscillator and generates a clocking signal when it is powered.

Figure 3:
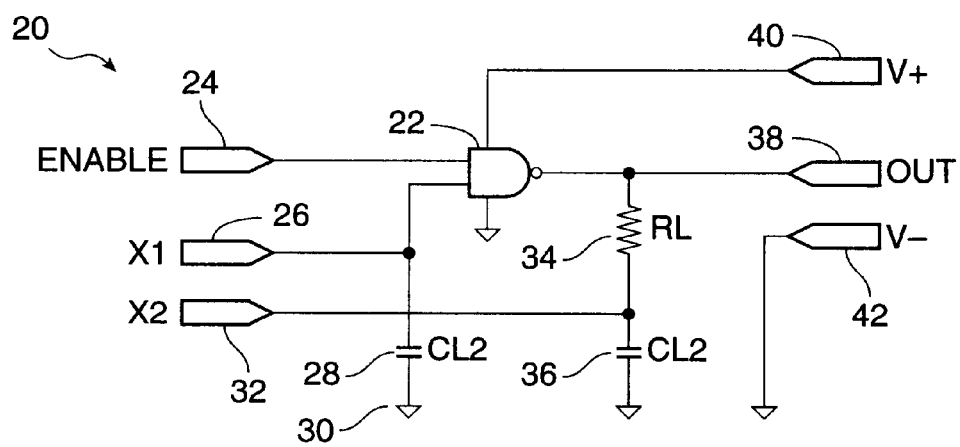
FIG. 3 illustrates the circuit of a typical clock oscillator used in most systems to generate a precise clock frequency, terminal X1 and X2 are used to connect to a two-pin or three-pin non-powered resonating impedance such as a crystal or ceramic resonator.
Figure 4:
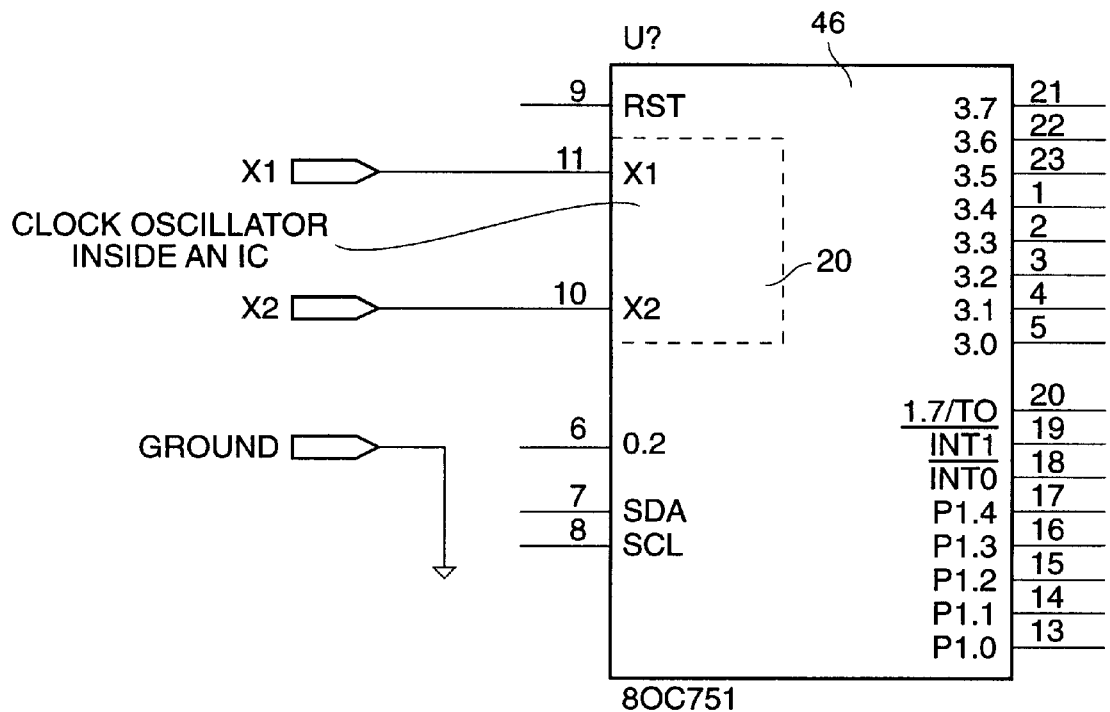
FIG. 4 illustrates a digital integrated circuit (IC) comprising a clock oscillator similar to the one in FIG. 3, the IC being typically a microprocessor or an ASIC chip.

The resonator 10 of FIG. 2a is connected with its two leads to a clock generator circuit and a clocking signal is obtained from the output as labeled therein. FIG. 3 is a schematic diagram of a typical prior-art clock generator circuit 20 which may employ a resonator such as passive resonator 10 of FIG. 2a. NAND gate 22 has one of its inputs connected to an enable node 24. Its other input is connected to X1 input 26 and a loading capacitor 28 to ground 30. X2 input 32 is connected to an RC network comprising series connected resistor 34 and loading capacitor 36 connected between the output of NAND gate 22 and ground. Loading capacitors 28 and 36 may have a typical value of about 27 pF. Output node 38 is connected to the output of NAND gate 22. Nodes 40 and 42 provide a positive voltage and ground potential respectively. Resonator 10 of FIG. 2a is connected to clock generator circuit 20 at input terminals 26 and 32 (X1 and X2, respectively). A load resistor 44, connected between output node 38 and loading capacitor 36 has a typical value of about 100 ohms. As illustrated in FIG. 4, and as is known in the art, clock generator circuit 20 may be a portion of a larger integrated circuit 46.

Figure 5:
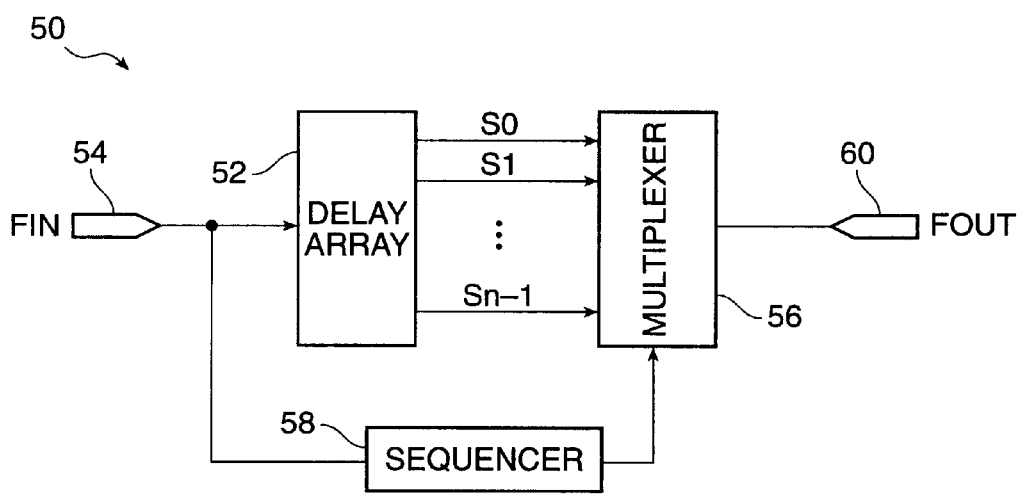
FIG. 5 illustrates a first preferred embodiment of the spreading circuit to spread the frequency of a signal received from a conventional clock oscillator.

Referring now to FIG. 5, a frequency modulating circuit 50 according to a first embodiment of the present invention comprises an array of delay elements 52. The delay elements 52 are grouped into a number of delay groups. The delay groups are connected and organized in a way that any delayed version of the input clocking signal at input node 54 can be obtained therefrom. Each of the delay groups has an output (S0 . . . S(n−1)) representing the input clocking signal being delayed for a particular number of periods of time. The inputs of a multiplexer 56 are coupled with all the outputs of the delay groups, respectively. A sequencer 58 produces a sequence of address signals, each corresponding to one of the inputs of the multiplexer 56. The multiplexer 56 selects one of the inputs based on the address signal received to produce an output assembled from the inputs thereof at output node 60. The various delays in the final output subsequently comprises a signal having a number of different frequencies therein so as to achieve the frequency modulation of the input clocking signal.

Apart from conventional frequency modulation, the embodiment of the frequency modulating circuit 50 of FIG. 5 herein uses no additional signal to modulate the input signal rather using the internal structure or topology of a plurality of delay elements. It can be foreseen that different topology of the internal delay elements can result in different modulation.

As will be appreciated by persons of ordinary skill in the art, multiplexer 56 comprises a plurality of inputs and one output and only one input thereof is selected and connected to the output at any time. Each of the inputs of the multiplexer 56 has an address, for example, 00000010 in binary or digital format. The sequencer 58 is a logic circuit that generates a control signal to control the operation of the multiplexer 56 and the control signal therefore comprises the address information such as 00000010, whereby the multiplexer 56 selects one of the inputs corresponding to the control signal received from the sequencer 58. It is known to those skilled in the art that the control signal can be pre-programmed to a desired pattern of addressing the inputs of the multiplexer 56, for example, linearly addressing or randomly addressing. Linearly addressing successively addresses the inputs of the multiplexer 56 in a fixed pattern. Randomly addressing addresses the inputs of the multiplexer 56 in a random unpredictable manner. It will be appreciated by persons of ordinary skill in the art that both addressing methodologies can be used in the disclosed spreading circuit.

Figure 6:
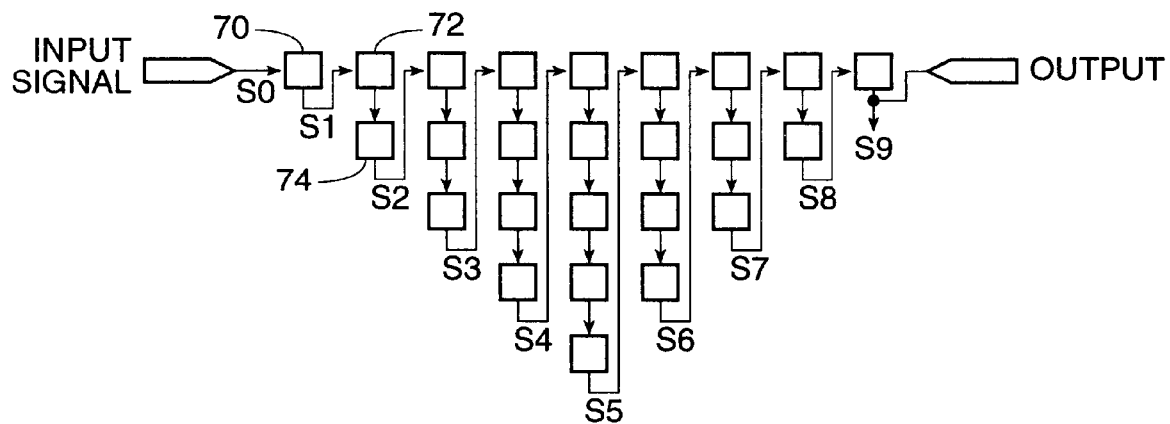
FIG. 6 depicts the internal topology of the delay elements used in the spreading circuit of FIG. 5 to modulate the received signal from the conventional clock signal.

The delay array 52 is an array of delay elements, each having at least one input and one output and delaying an input signal received at the input by a unit delay D. Each delay element may comprise, for example, a gate or inverter. FIG. 6 is a block diagram illustrating one topology of the delay elements in delay array 52. Although each of the delay elements is connected in series, the outputs are selected from a few delay groups based on a triangular pattern as clearly shown in the figure. Each delay group has one more or less delay element than its adjacent group. When an input signal is received at delay element 70, namely a single-element delay group, the signal is delayed once and output at S1. The once-delayed signal is received at delay element 72 and output at S2 through the delay elements 72 and 74, hence through a delay group having two delay elements.

Figure 7:
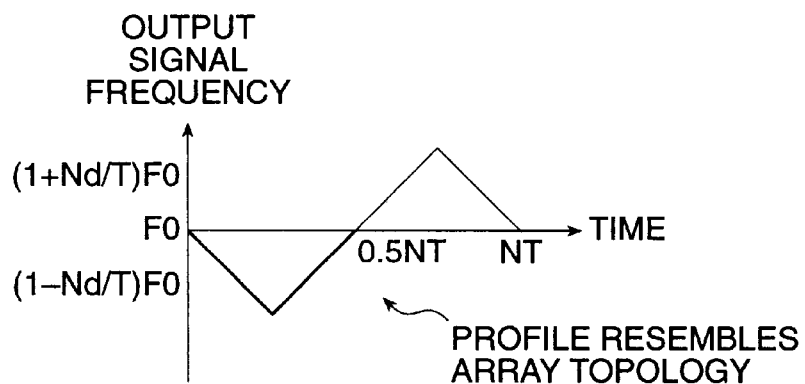
FIG. 7 depicts an inherent waveform modulating the frequency of the signal from the topology of FIG. 6.

As shown in FIGS. 5 and 6, a sequence of delayed signals are generated as the input signal passes all the delay elements, each labeled as S0, S1, S2, S3, S4, S5, S6, S7, S8 and S9, where S0 is the input signal with no delay. These signals are each connected to the inputs of the multiplexer 56, respectively. Based on the received control signal from the sequencer 58, the multiplexer 56 connects one of signals S0, S1, S2, S3, S4, S5, S6, S7, S8 and S9 to the output thereof. Consequently, the output is the combined outputs of the delay array 52, representing the input signal originally received at the delay element 70 but with regulated delays. The frequency of the input signal is thus inherently modulated by the delay array 52. In other words, the frequency of the input signal is modulated by an inherent triangular wave signal as illustrated in FIG. 7. For illustration purpose, the inherent triangular wave is explicitly depicted in FIG. 7 and it should be understood that the wave is not generated individually or separately. It is an inherent waveform representing the delays by the delay groups. It can be further understood that the frequency of the input signal is actually modulated by the topology of the delay array.

Figure 8A:
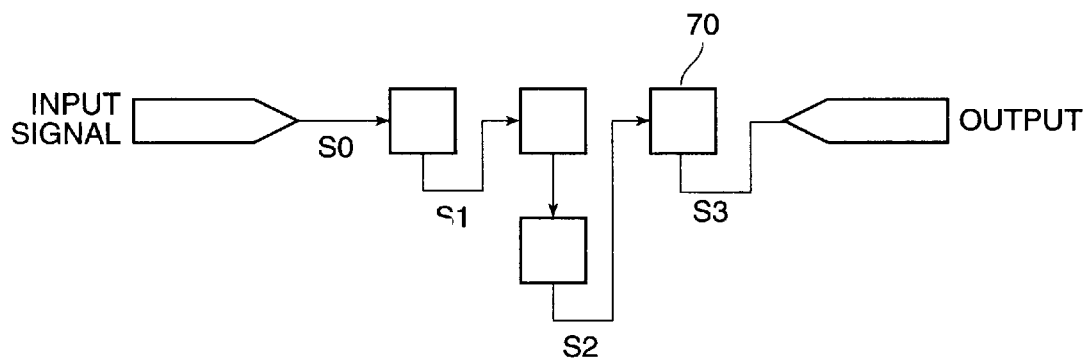
FIG. 8(a) is a diagram illustrating a simple embodiment of the disclosed spreading circuit employing with only four delay elements.

Now it is apparent to those skilled in the art that the frequency of the input signal may be modulated by other topologies such as sawtooth shape topology that is shown in FIG. 8a. The delay elements in FIG. 8a are all connected in series, but the outputs S0, S1, S2, . . . SN are extracted from the those delay elements that make the input signal delay in the triangular pattern. To make a complete array of delayed inputs, S0, the original signal with delay, is generally included and connected to the multiplexer of FIG. 6.

Figure 8B:
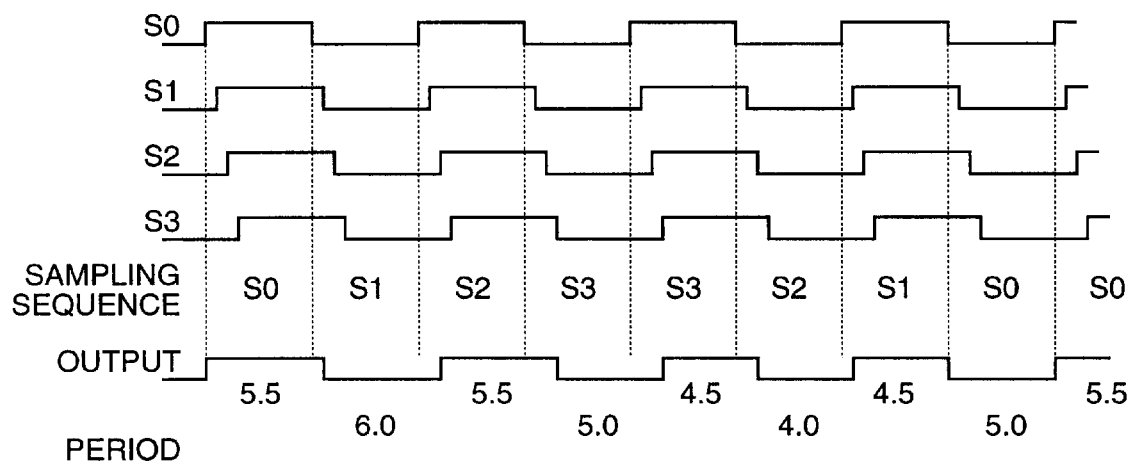
FIG. 8(b) is a plot of corresponding logic signals from the embodiment shown in FIG. 7(a).

To be more specific on how the delay elements inherently modulate the frequency of the input signal, reference is now made to FIG. 8a and FIG. 8b. FIG. 8a shows a simple array 70 used to generate an output as shown in FIG. 8b. As illustrated in FIG. 8a, the delay array 70 comprises three delay groups comprising four delay elements and producing three delayed signals. Two of the delay groups comprise one delay element and the third one comprises two delay elements.

For completeness, a multiplexer such as the one in FIG. 6 (not shown) receives four outputs S0, S1, S2 and S3 from the delay array. S0 is the input signal, S1 is the once-delayed input signal, an output of one delay element, S2 is the three times-delayed input signal, an output of three consecutive delay elements or twice-delayed S1 and S3 is the four times-delayed input signal, an output of four consecutive delay elements or once-delayed S3. Each of the outputs S0, S1, S2 and S3 is shown in FIG. 8b wherein S0 is also the input signal. In addition, the output of a sequencer such as the one in FIG. 5 is also shown in FIG. 8b. It is by now understood that the outputs S0, S1, S2 and S3 are each connected to each of the inputs of the multiplexer, respectively. Therefore the output in FIG. 8b should be considered the output of the multiplexer controlled by the sequencer.

Controlled by the input signal referenced by S0 in FIG. 8b, the sequencer generates an address signal, such as a0, a1, a2, a3, a3, a2, a1 and a0, periodically and repeatedly in binary format. Accordingly, the multiplexer selects one input from the available four inputs S0, S1, S2 and S3 each time the multiplexer receives a new address signal from the sequencer. It is assumed that the sequencer sends out a0, the output is accordingly connected to S0. When the input signal changes from high to low, the sequencer send out a new address a1, accordingly S1 is connected to the output. Similarly the portion of S2 and S3 during a2 and a3, respectively, are passed to the output. Now a careful examination of the output reveals that the frequency of the original input has been altered and it becomes more obvious to further repeat the procedures for a3, a2, a1, a0 and a0.

Moreover, it can be observed from the output trace in FIG. 8b that the frequency changes become periodically around the original frequency, namely the original frequency F changes within a limit from F−Δ to F+Δ, where Δ is controlled by the topology of the delay elements.

Further the modulation profile (frequency vs. time) can be proven to be related to the topology of the delay elements. If the array is arranged such that the top (input) of all columns are aligned horizontally, then the bottom profile of the array resembles the half cycle of the frequency modulation curve. For instance, a triangular delay array is shown in FIG. 6. The corresponding triangular frequency variation pattern is obtained at the output as demonstrated by FIG. 8b. It can be proven mathematically that the variation cycle is determined by NT, where T is the input clock cycle period; N is number of columns in the delay array. The percentage of spreading is ±Nd/T *100%, where d is the delay time of the delay element. For the method to work properly T must be greater than dN(N+1). These rules are sufficient for the design of the aforementioned frequency spreading circuit.

Figure 9:
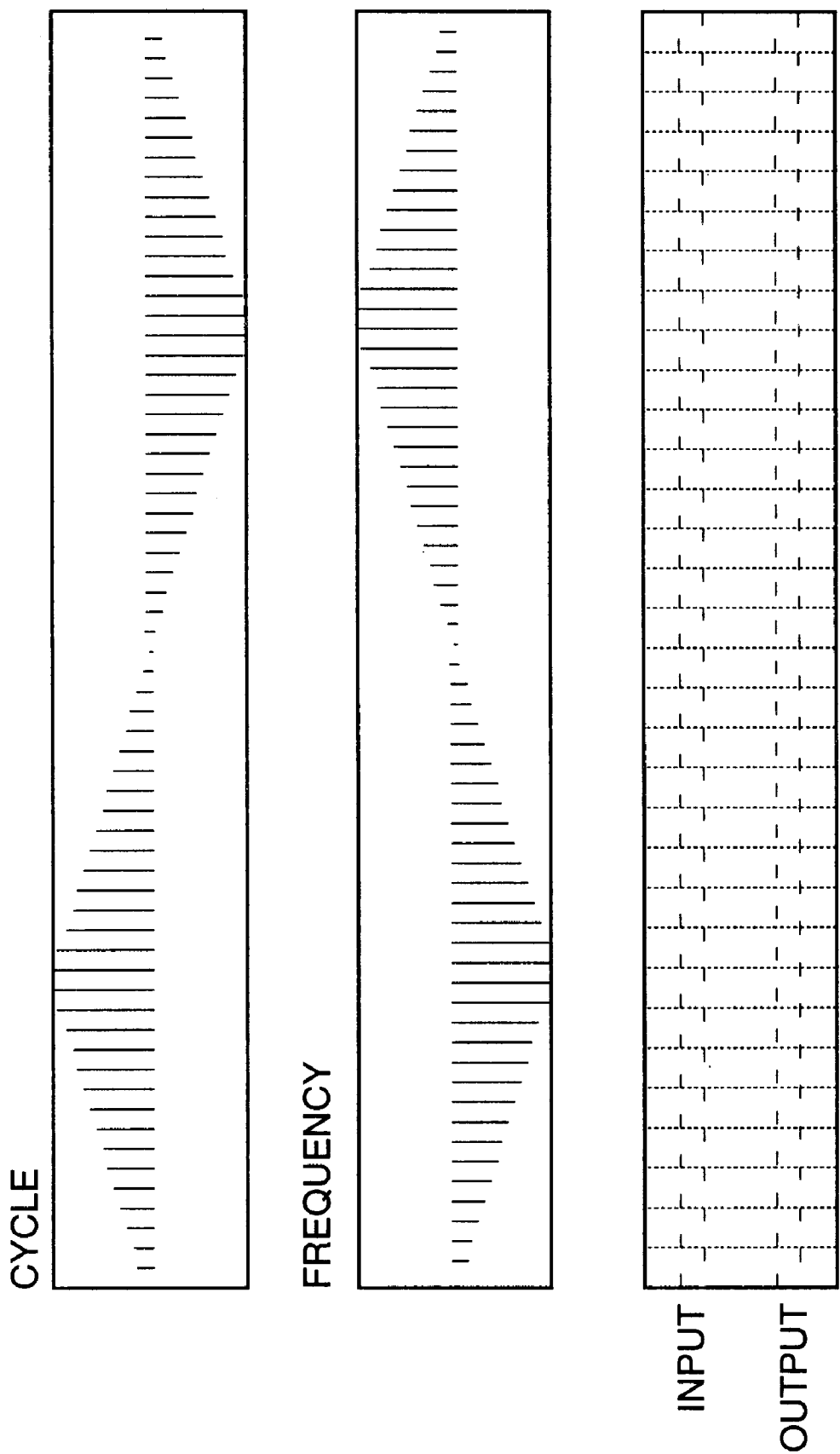
FIG. 9 illustrates the results of a simulation for a topology with 32 columns of delay elements in a triangular array.

A set of simulated curves are shown by FIG. 9, where a longer delay array is used to generated a smooth-varying output frequency with a spreading of ±2.3% around the input frequency. In practical devices much smaller spreading could be used to produce the effect for reducing EMI of higher harmonic frequencies by using small delay variable d. With present solid state technology it is possible to construct delay arrays with unit delays in the order of $10^{-12}$ second, thus providing a wide range for the choice of frequency, spreading ratio and modulation cycle.

The upper portion of FIG. 9 is the period of the simulated spread clock signal as a function of time. The height of the vertical bars represent the value at the specific time indicated in the horizontal axis. The center value on the vertical axis is the nominal period. The center portion of FIG. 9 is a plot of frequency as a function of time. The center value on the vertical axis is the nominal frequency. The bottom portion of FIG. 9 is the time-domain chart of output amplitude vs time. The upper signal is the original (or reference) signal which is a precise frequency. The lower signal wave form is the spread signal, which goes through a slow-down then restore and speed up then restore cycle.

A second embodiment of the frequency spreading circuit according to the present invention is based on the detection of the frequency of the input clocking signal. A pair of frequency detectors is used to examine the boundary limit of the frequency of an external oscillator. A proper signal is generated to control a parameter in the external oscillator to alter its frequency. Normally one detector responds when the frequency is increased beyond an upper limit, the response causes the frequency to be decreased. Another detector responds when the frequency is decreased under a lower limit, the response causes the frequency to be increased. The alternating increasing and decreasing frequency is actually modulating the frequency of the clocking signal so as to achieve to spread the frequency with a limit around the original frequency.

Figure 10:
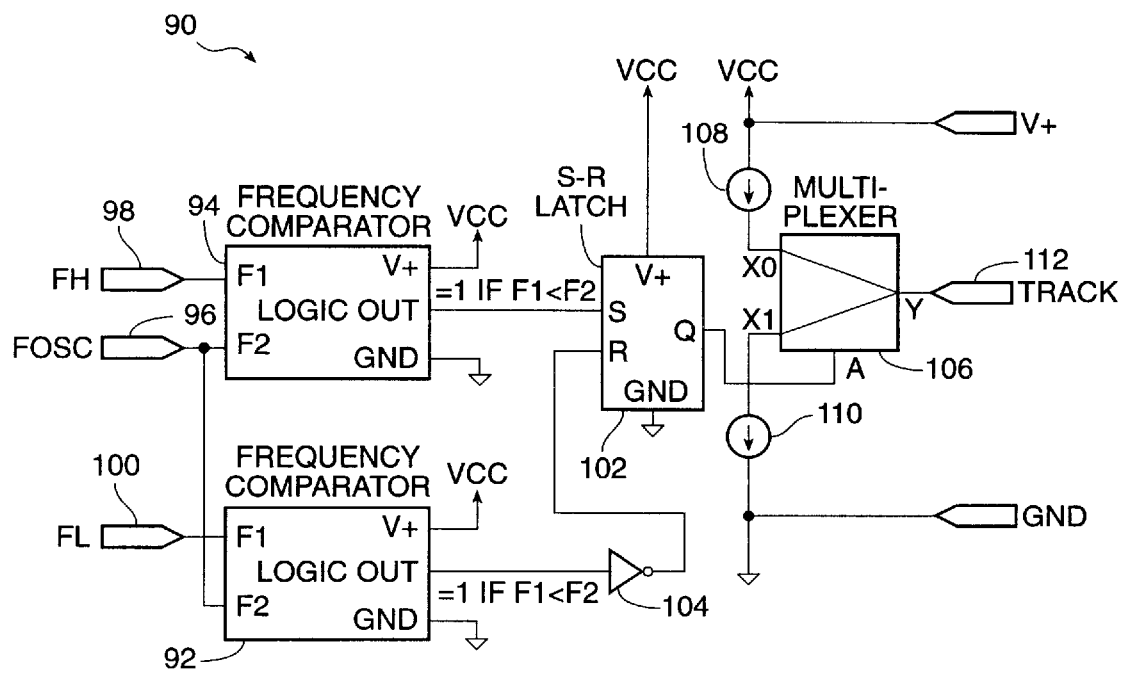
FIG. 10 is a diagram illustrating a second preferred embodiment of the spreading circuit that can spread a frequency of a signal between two predetermined frequencies.

Now referring to FIG. 10, there is demonstrated the second embodiment of the spreading circuit that can effectively spread a frequency of a controlled oscillator within a limit without using a modulating signal; The circuit 90 in FIG. 10 comprises two frequency detectors 92 and 94. The frequency detector 92 or 94 outputs either a low or high signal. The frequency detectors 92 and 94 may comprises Phase-Frequency Detectors, such as sold as part No. MC4044 available from Motorola Incorporated of Schaumburg, Ill. 60196. The output from the frequency detectors 92 and 94 is determined by comparing the frequency of the input signal FOSC at node 96 with high and low bound frequency signals FH and FL, supplied on nodes 98 and 100, respectively. The frequency parameters FH and FL define a range to spread the frequency FOSC of the input signal therebetween.

When the frequency FOSC of the input signal is greater than FH, the frequency detector 94 outputs a high signal at the S terminal of the S-R latch 102. When the frequency FOSC of the input signal is smaller than FL, the frequency detector 92 outputs a low signal, causing a high signal (through inverter 104) at the R terminal of the S-R latch 102. The output of the S-R latch 10 becomes high when the output of the frequency detector 94 produces a high signal, indicating that the frequency FOSC of the input signal is greater than FH. The output of the S-R latch 102 is coupled the select terminal of a multiplexer 106, which will select one of the constant current sources 108 and 110. A low signal on the select terminal A of the multiplexer 106 causes an out-flowing constant current at TRACK terminal 112. A high signal on the select terminal A of the multiplexer 106 causes an in-flowing constant current at the TRACK terminal 112.

Figure 11:
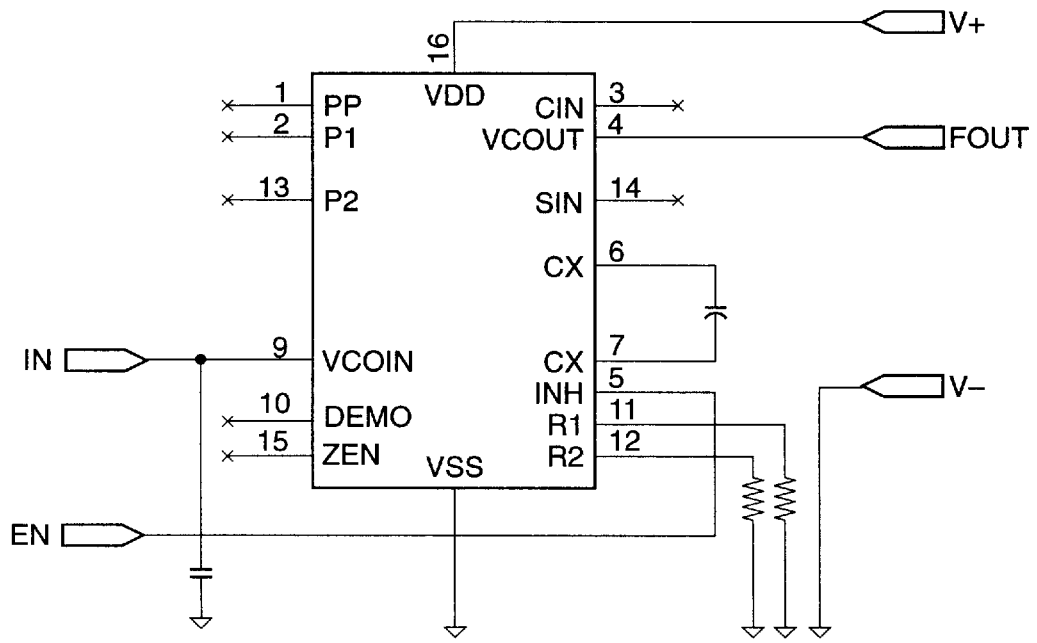
FIG. 11 is a diagram illustrating an example of a conventional CCO (Current Controlled Oscillator) which can be utilized with the spreading circuit of FIG. 10

The circuit of FIG. 10 can work with an external current-controlled oscillator (CCO) to achieve frequency spreading according to the present invention. A typical CCO is illustrated by FIG. 11, using a 14046 VCO circuit made by Motorola, Inc. The frequency of a CCO is controlled by the current flow into its control terminal. A current that flow into the control terminal causes the oscillator to increase its oscillating frequency linearly over time. A current flow out from the CCO's control terminal causes its frequency to decrease with time. For instance, a CCO can be connected in such a way that when is input terminal receives a positive current the output frequency increases, and vise versa. When F<FL the Y on the S-R latch changes to low and the control current flow into the CCO, causing FOSC to increase. Y remains high when frequency rises until F>FH, at which time Y will become high. This causes the control current to flow back from the CCO, thus decreasing the frequency. This pattern of frequency change will continue to form a periodic variation of F between FH and FL. For a linear CCO the modulation profile is triangular.

A third embodiment of the frequency spreading circuit is also based on the detection of the frequency of the input clocking signal. A single frequency detector is used to examine the frequency of an external oscillator (not illustrated). A signal is generated to control a parameter in the external oscillator to alter its frequency. Normally the detector responds when the frequency is increased beyond the point set by a reference frequency. A delay circuit is inserted between the detector output and the frequency controlling point of the oscillator to delay the control so as to allow the frequency to travel beyond the reference frequency. The oscillator output periodically increases and decreases in frequency, thus effectively achieving to spread the frequency with a limit around the reference frequency.

Figure 12:
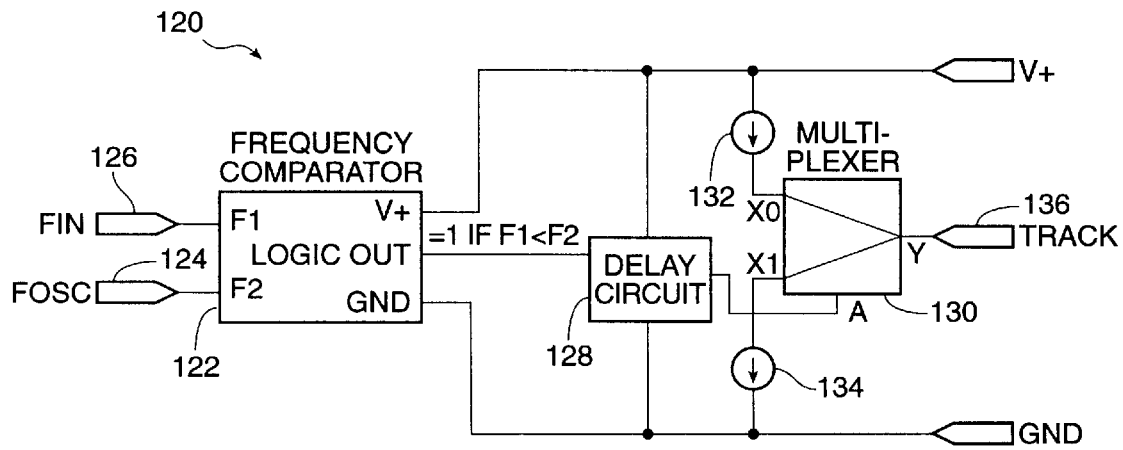
FIG. 12 is a diagram illustrating a third preferred embodiment of the spreading circuit that can spread a frequency of a signal around a central frequency.

Now referring to FIG. 12, there is demonstrated the third embodiment of a spreading circuit 120 that can effectively spread a frequency of a controlled oscillator within a limit without using a modulating signal; Spreading circuit 120 of FIG. 12 comprises a frequency comparator 122. The frequency comparator 122 outputs either a low or high signal depending on the relationship between the input frequency FOSC at node 124 and a reference frequency FIN at node 126. The frequency detector 122, also called a Phase-Frequency Detector, such as embodied in integrated circuit part no. MC4044 available from Motorola Inc. The frequency parameter FIN defines the center frequency of the spread frequency.

When the frequency FOSC of the input signal is greater than FIN, the frequency comparator 122 outputs a high signal at the input of the delay circuit 128. Delay circuit 128 may comprise a number of cascaded gates. When the frequency FOSC of the input signal is smaller than FIN, the frequency comparator 122 outputs a low signal, causing a low signal on the input of the delay circuit 128. The delayed signal from the output of the delay circuit 128 is applied to the select terminal of a multiplexer 130, which will select one of the constant current sources 132 and 134. A low signal on the select terminal A of the multiplexer 130 causes a constant current to flow out of TRACK terminal 136. A high signal on the select terminal A of the multiplexer 130 causes a constant current to flow into the TRACK terminal 136.

If an external CCO like that shown in FIG. 11 is connected to the circuit of FIG. 12 such that the controlling input of the CCO is connected to the TRACK terminal 136, and the output of the CCO is connected to the terminal FIN. Further assume the oscillator initially has a frequency FOSC which is not exactly equal to the reference frequency FIN, such that, for example, FOSC<FIN. The output of the frequency comparator 122 becomes low. After a predetermined delay period D set by the delay circuit 128, the low signal is applied to the select terminal A of the multiplexer 130. This causes a constant current to flow out of TRACK terminal 136 to the controlling input of the CCO, causing FOSC to increase.

When FOSC reaches FIN, the output of the frequency comparator 122 changes to high. The oscillator frequency FOSC will continue to increase for a period of D after it reaches FIN. At the end of the period the D the high signal is applied to terminal A of the multiplexer 130, causing a constant current to flow into the TRACK terminal 136 to decrease the oscillator frequency FOSC. During this frequency-decrease period the actions are similar: the FOSC is allowed to continue to decrease for one delay period D after it has become less than FIN; then the decrease will cease and FOSC will begin to increase. This frequency modulation will be a periodic variation of FOSC between thresholds FH and FL, which depend on the delay set in delay circuit 128. For a linear CCO the modulation profile is triangular. The symmetry of positive and negative deviation from the center frequency can be adjusted by individually adjusting the constant current outputs of current sources 132 and 134.

Figure 13:
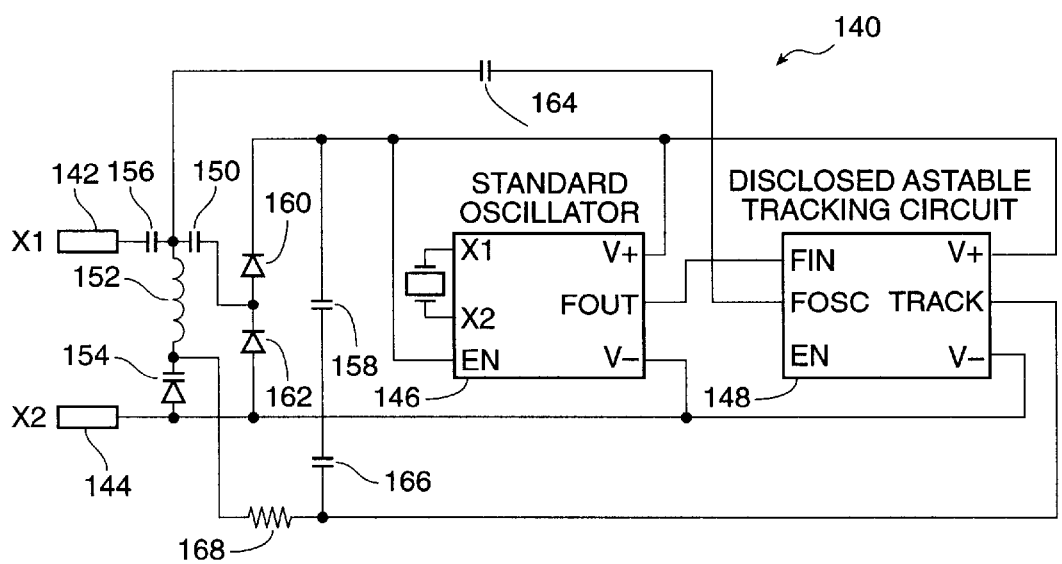
FIG. 13 is a diagram illustrating a preferred embodiment of a two-pin non-powered resonating circuit that uses the spreading circuit in FIG. 10 to form a variable impedance across X1 and X2.

Referring now to FIG. 13, a first oscillator device 140 according to the present invention includes terminals X1 and X2, at reference numerals 142 and 144, respectively, and is compatible with and thus may replace the standard two-pin non-powered resonator 10 illustrated in FIG. 2a. This oscillator device 140 may be disposed in the same package as such devices according to an aspect of the present invention. The oscillator device 140 is ready to be used as a crystal or ceramic resonator in any standard oscillator circuit such as the one shown in FIG. 3.

The oscillator device 140 itself comprises a standard oscillator circuit 146 such as the one shown in FIG. 3 and a signal spreading circuit 148 such as the one shown in FIG. 10. The signal spreading circuit 148, also referred to as frequency modulating circuit herein, is directly connected to the output of the oscillator 146. The signal spreading circuit 148 receives the pure signal from the oscillator 146 and spreads the frequency spectrum of the higher harmonics of EMI once the signal is applied to the electronic components.

The oscillator circuit 140 of FIG. 13 includes a resonating circuit utilizing the two terminals 142 and 144, X1 and X2 of the two-pin resonator that oscillator circuit 140 replaces. The circuit comprises capacitor 150 (typical value about 0.01 $\mu$F), inductor 15 (typical value about 1 $\mu$h) and tuning diode 154. The tuning diode 154 is sometimes referred to as a "varicap". It acts as a variable capacitor whose capacitance increases as the voltage across its terminals decreases. The impedance of capacitor 156 (typical value about 0.01 $\mu$F) is chosen to be negligibly low compared with that of tuning diode 154, therefore the loop impedance from terminal X1 to X2 is determined by the series resonance impedance formed by inductor 152 and tuning diode 154. When terminals 142 and 144 (X1 and X2) are connected to the standard oscillator circuit in FIG. 3, a typical LC oscillator is created. The frequency of oscillation is determined by the value of inductor 152, the loading capacitors 28 and 36 of the oscillator circuit of FIG. 3, and the capacitance of tuning diode 154. By varying the voltage on the tuning diode 140 the oscillator frequency can be varied.

Because a resonator is a passive device that requires no dedicated power input to operate, such pins as VCC or ground are not available in the two-pin package. The oscillator 146 and the spreading circuit 148 must be provided with power to operate. Power is not available from the two-pin package which has no power and ground pins. The only two pins 142 and 144 on the package are used for signals X1 and X2. To solve this problem, the power available at the phase-inverting alternating potential between the terminals 142 and 144 for X1 and X2 is utilized. A "floating" ground reference potential is created at signal pin X2. The phase-inverting alternating potential between the X1 and X2 signal pins carry enough power for low-power CMOS electronics that make the circuit therein to operate. The capacitor 156 appears as low impedance to the frequency of the oscillating signal at pin X1 with regard to pin X2, or in other words, the impedance is low at the oscillating frequency. Capacitor 156 isolates the D.C. component between X1 and X2, resulting in a pure AC component. At the common connection of capacitors 152 and 150, capacitors 150 and 18 and diodes 160 and 162 form a full-wave rectifier that efficiently make a stable D.C. power available across capacitor 158. The loading of the electronic circuits thereafter draw a pure D.C. current from it, equivalently applying a pure resistive impedance across X1 and X2. Capacitor 164 is a low capacitance (typical value about 10 pF) through which the oscillating frequency is sampled by spreading circuit 148. Capacitor 166 (typical value about 1000 pF) is an integrating capacitor that converts the constant current output of spreading circuit 148 into a triangular wave voltage signal. This voltage waveform is applied to tuning diode 150 through large value resistor 168 (typical value about 10 k ohms) without affecting its capacitance.

The principle of operation of oscillator circuit 140 of FIG. 13 is as follows: When the terminals X1 and X2 are connected to the corresponding terminals of a standard oscillator, the arbitrary capacitance of the tuning diode 154 establishes an arbitrary frequency of oscillation. A stable D.C. power is available across capacitor 158 (typical value about 0.01 $\mu$F) shortly after the oscillation is established. All the electronics become functional. The oscillating frequency is compared by the spreading circuit 148 against the reference frequency generated by standard oscillator 146. The spreading circuit 148 then generates proper timing and pattern on the current at it's TRACK terminal to produce a periodically varying frequency of oscillation around the reference frequency set by the effect on tuning diode 154 of the voltage on capacitor 166 thus to achieve to spread the frequency spectrum.

Figure 14:
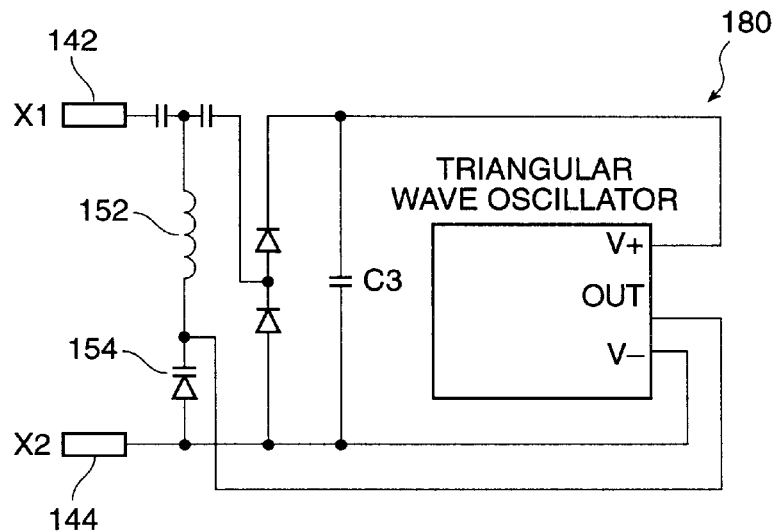
FIG. 14 is a diagram illustrating a second preferred embodiment of the two-pin non-powered resonating circuit, its operation is also powered by the energy available at X1 and X2 hence no external power is required.

A second oscillator device 180 according to the present invention is compatible with and may thus replace the standard two-pin non-powered resonator and is illustrated in FIG. 14. The device is a simplified version of the oscillator device of FIG. 13 and like reference numerals are employed for like structures in the two drawing figures. Like components in FIGS. 13 and 14 may have like values. The frequency of the oscillator of FIG. 14 is not tracked automatically to be around an internal reference frequency. Rather it is determined strictly by the choice of values of inductor 152, varicap 154 and the loading capacitors 28 and 36 of the oscillator of FIG. 3 connected to X2 and X2 terminals 142 and 144 of FIG. 14. This variation has the advantage of low cost and can be used in where the accurate center frequency is not required for the system to operate.

Figure 15:
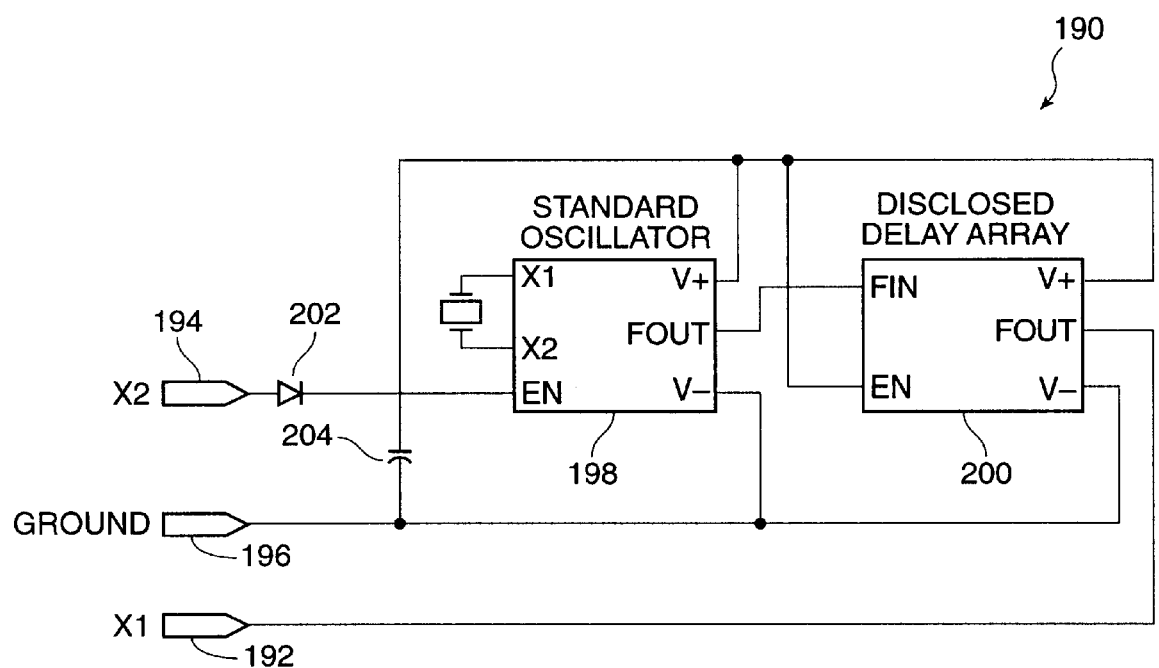
FIG. 15 is a diagram illustrating a preferred embodiment of a three-pin non-powered resonating circuit using the frequency spreading circuit described in FIG. 4.

A third preferred oscillating device 180 according to the present invention is illustrated in FIG. 15. Oscillating device 180 is compatible with and may thus replace the prior-art three-pin, non-powered resonator 12 shown in FIG. 2b. The device 180 includes X1 terminal 192, X2 terminal 194 and ground terminal 196. Oscillating device 190 includes a standard oscillator circuit 198 such as the one illustrated in FIG. 3 and delay array 200. A rectifier circuit is formed by diode 202 and capacitor 204 (typical value about 0.01 µF). With the ground available this simple rectifier works effectively to produce a stable D.C. power across capacitor 204, which powers the rest of the circuit.

The oscillating device 190 produces a periodically varying frequency around the reference frequency set by the internal resonator.

Figure 16:
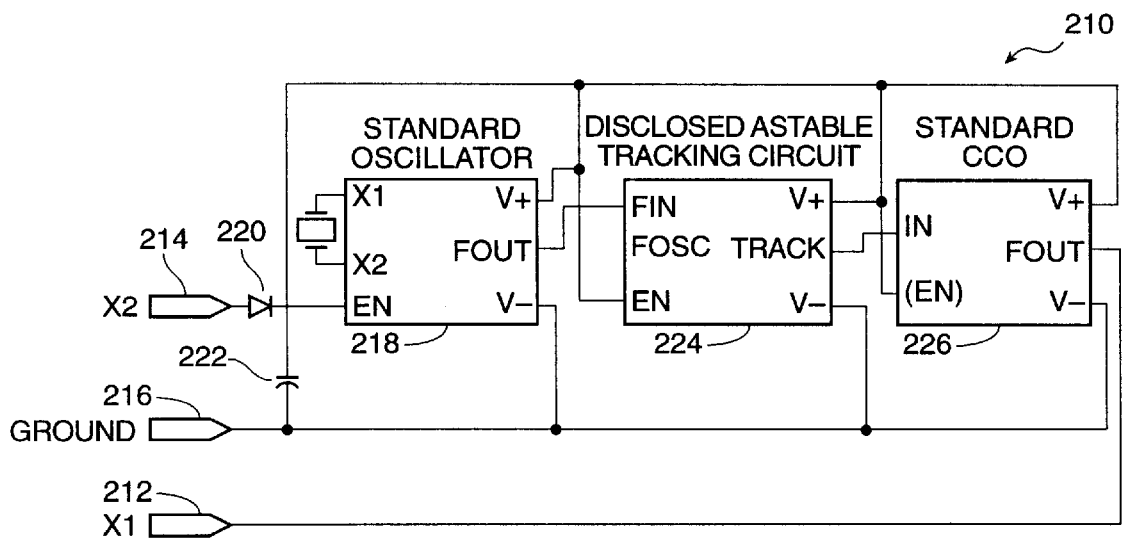
FIG. 16 is a diagram illustrating a second preferred embodiment of the three-pin non-powered resonating circuit that uses the frequency spreading circuit described in FIG. 10.

A fourth preferred oscillating device 210 according to the present invention is illustrated in FIG. 16. Oscillating device 190 is compatible with and may thus also replace the three-pin, non-powered resonator shown in FIG. 2b. Oscillating device 210 includes X1 terminal 212, X2 terminal 214 and ground terminal 216. Oscillating device 210 includes a standard oscillator circuit 218 such as the one illustrated in FIG. 3. A rectifier circuit is formed by diode 220 and capacitor 222 (typical value about 0.01 µF). With the ground available this simple rectifier works effectively to produce a stable D.C. power across capacitor 222, which powers the rest of the circuit. The oscillating device 210 produces a periodically varying frequency around the reference frequency set by the internal resonator. Oscillating device 210 is similar to the third preferred oscillating device 180 of FIG. 15 with the exception that the delay array circuit is replaced by a combination of the tracking circuit 224 like that of FIG. 12 and a typical CCO circuit 226.

Figure 17:
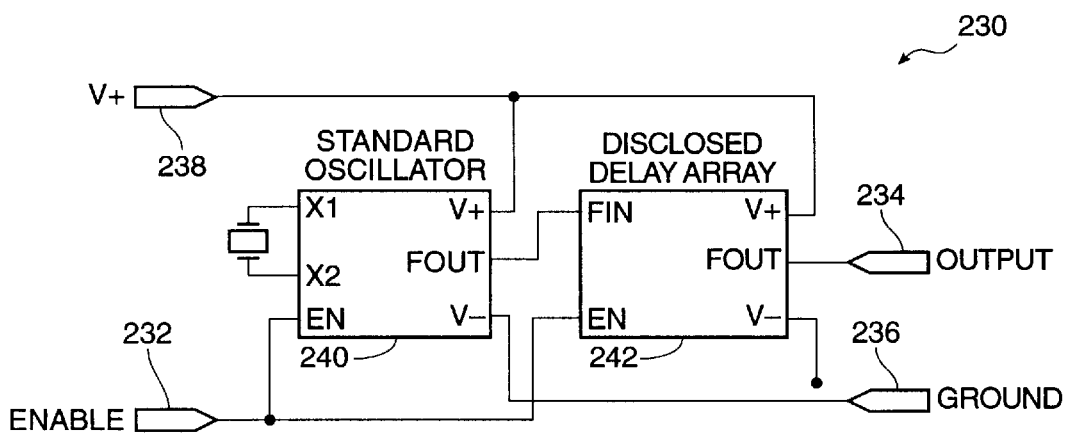
FIG. 17 is a diagram illustrating a preferred embodiment of a four-pin clock oscillator that uses the frequency spreading circuit described in FIG. 4, including a power control pin (Enable) is used to turn off oscillation and put the device into a low-power idle mode.

A fifth preferred oscillating device 230, illustrated in FIG. 17, is compatible with and may thus replace the standard, four-pin powered clock oscillators shown in FIG. 2c. Oscillating device 230 includes enable terminal 232, output terminal 234 and ground terminal 236, as well as positive voltage supply terminal 238. A typical oscillator 240 like that of FIG. 3 is used by the circuit to generate the reference frequency. The frequency spreading circuit 242 is similar to the one illustrated by FIG. 5. The operation of the circuit has been described in detail previously.

Unlike the aforementioned two-pin and three-pin devices, the oscillating device 230 of FIG. 17 is an independent oscillator. The output, namely the clock signal, of the device is provided through the OUTPUT terminal 234 that is meant to be coupled with the electronic components in the system. The ENABLE terminal 232 is used to enable the clock oscillation. When a low signal is received by the ENABLE terminal 232 the oscillator enters a low power mode and the output clock signal at the OUTPUT terminal 234 becomes a constantly low signal. When a high signal is received at the ENABLE terminal 232, the oscillation resumes. As will be appreciated by persons of ordinary skill in the art, the ENABLE terminal 232 may be coupled to a pullup resister so that when not connected to any external signal the terminal assumes a high state thus to constantly enable the oscillation.

Figure 18:
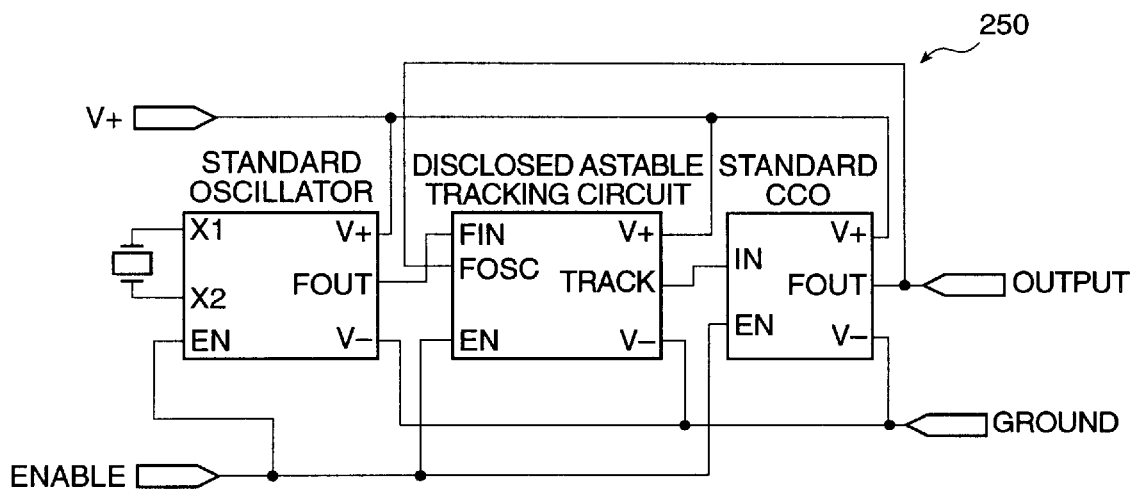
FIG. 18 is a diagram illustrating a second preferred embodiment of the four-pin clock oscillator that uses the frequency spreading circuit described by FIG. 10.

A sixth preferred oscillating device 250 is illustrated in FIG. 18. Oscillating device 250 is similar to oscillating device 230 of FIG. 17 except that the frequency spreading circuit is replaced by a combination of the disclosed spreading circuit of FIG. 10 and a typical CCO.

Figure 19:
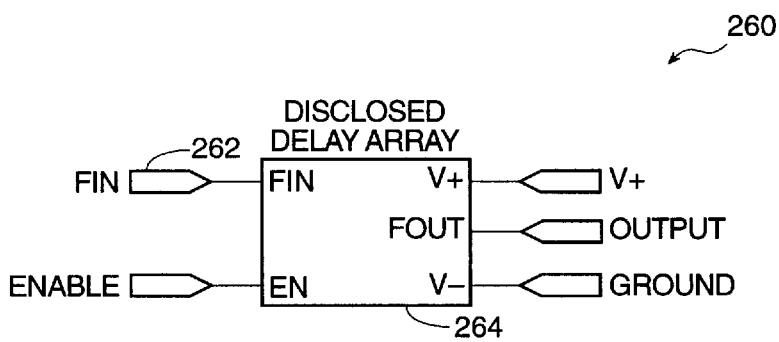
FIG. 19 is a diagram illustrating a preferred embodiment of a four-pin clock oscillator adapter that uses the frequency spreading circuit described in FIG. 5 for insertion between a standard four-pin clock oscillator and its original socket.

A seventh preferred oscillating device 260 is illustrated in FIG. 19. Oscillating device 260 is similar to oscillating device 230 of FIG. 17 except that the internal oscillator is removed from the circuit. Therefore a reference frequency input is required at terminal FIN 262 for the device to operate. The intention is to insert this device between an existing standard clock oscillator and the circuit it originally drives. The original standard clock oscillator supplies the required reference frequency at terminal 262 or the oscillating device 260, which in turn provide a frequency-spread clock signal from delay array 264 to the original system.

Figure 20:
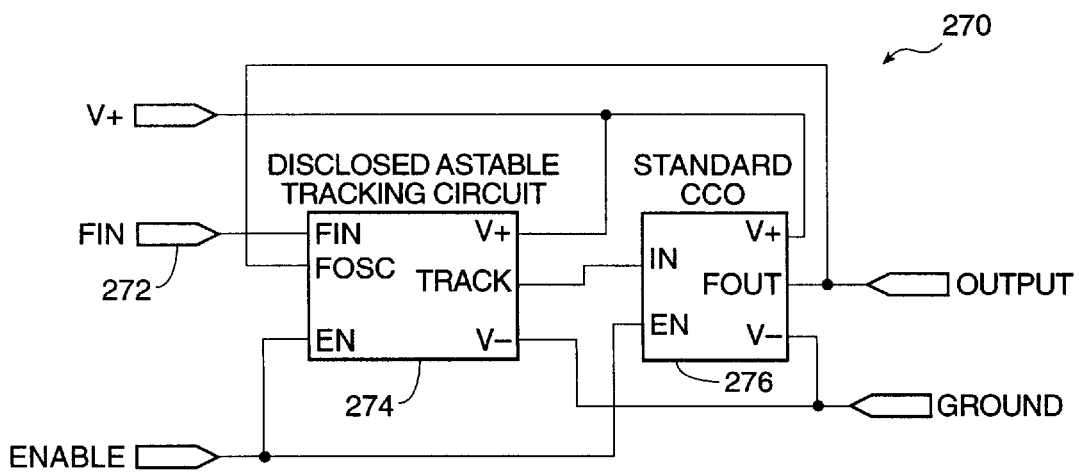
FIG. 20 is a diagram illustrating a second preferred embodiment of the four-pin clock oscillator adapter that uses the frequency spreading circuit described by FIG. 10.

Another preferred oscillating device 270 is disclosed by FIG. 20, which uses another disclosed circuit, or the circuit in FIG. 10, to do the frequency spreading. Like the embodiment of FIG. 19, oscillating device 270 is a four-pin device which requires an input frequency at terminal FIN 272 for the device to operate. As with the embodiment of FIG. 19, the intention is to insert this device between an existing standard clock oscillator and the circuit it originally drives. The original standard clock oscillator supplies the required reference frequency for the oscillating device 270, which in turn provide a frequency-spread clock signal from tracking circuit 274 and CCO 276 to the original system.

Figure 21A:
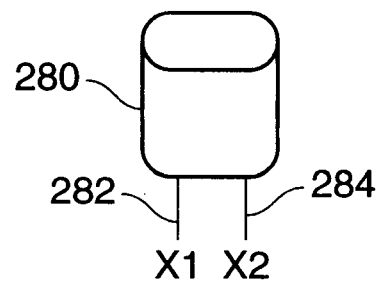
FIGS. 21a and 21b are perspective views of preferred packages that may readily replace a conventional non-powered two-pin resonator.
Figure 21B:
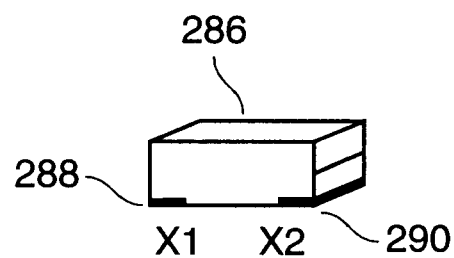

Referring now to FIGS. 21a and 21b, perspective views are shown of two preferred external structure or packaging for the first and second oscillating devices disclosed herein. Both packages have at least two pins wherein two pins are used for the useful signals of X1 and X2. Package 280 of FIG. 21a is leaded including leads 282 and 284 and package 286 of FIG. 21b is non-leaded or "surface mount" and includes connection pads 288 and 290. The packages are sized to have the same form factors as the prior art packages they replace. The packages can be formed from metal or non-metal materials for various applications as is known in the art.

Figure 21C:
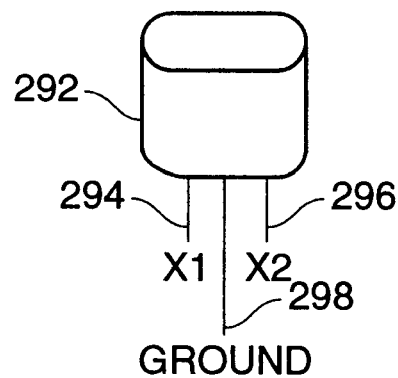
FIGS. 21c and 21d are perspective views of preferred packages that may readily replace a conventional non-powered three-pin resonator.
Figure 21D:
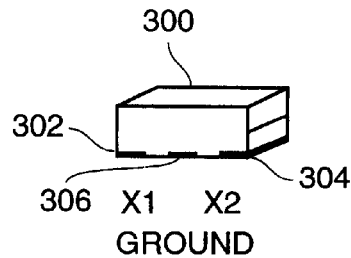

Now referring to FIGS. 21c and 21d, perspective views are shown of two preferred external structure or packaging for the third and fourth oscillating devices disclosed herein. Both structures have at least 3 pins wherein 3 pins are used for the useful signals of X1, X2 and ground. Structure 292 of FIG. 21c is leaded, including leads 294, 296, and 298, for X1, X2, and ground, respectively, and structure 300 of FIG. 21d is non-leaded or "surface mount" and includes pads 302, 304, and 306, for X1, X2, and ground, respectively. The packages are sized to have the same form factors as the prior art packages they replace and can be formed from metal or non-metal materials for various applications as is known in the art. When metal is used as the packaging the enclosure is connected to GROUND terminal 306 to minimize EMI.

Figure 21E:
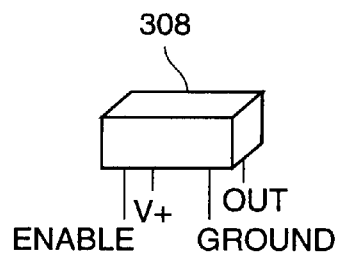
FIGS. 21e and 21f are perspective views of preferred packages that may readily replace a conventional four-pin, active crystal oscillator.
Figure 21F:
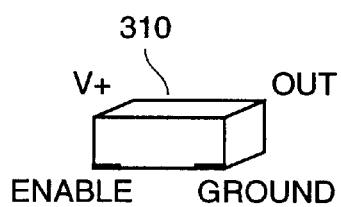

Now referring to FIGS. 21e and 21f, there are shown perspective views of two preferred external structure or packaging for the fifth and sixth oscillating devices disclosed herein. Both structures 308 and 310 have at least 4 terminations (leads in structure 308 and pads in structure 310) used for the useful signals of ENABLE, ground, output and V+. Structure 308 of FIG. 21e is leaded and structure 310 of FIG. 21f is non-leaded or "surface mount". The packages are sized to have the same form factors as the prior art packages they replace and can be formed from metal or non-metal materials for various applications as is known in the art. When metal is used as the packaging the enclosure is connected to the GROUND terminal to minimize EMI.

Figure 21G:
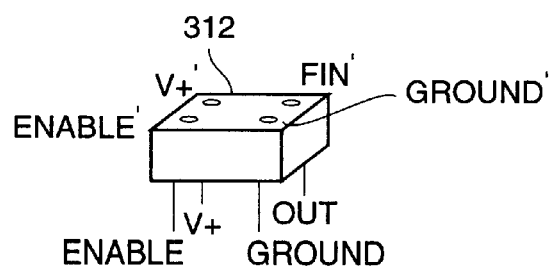
FIG. 21g is a perspective view of a preferred package for a frequency spreading adapter socket into which a conventional four-pin, active crystal oscillator may be placed.

Referring now to FIG. 21g, a perspective view is shown for a presently preferred external structure or packaging of the seventh and eighth oscillating devices disclosed herein. The structure resembles a socket having at least 4 pins. The socket 312 of FIG. 21g therefore is so designed that the socket 312 itself can be plugged into the original socket of the oscillator and the oscillator can be further plugged into the socket 312. The four leads ENABLE, GROUND, OUT and V+ of the socket 312 corresponds to the four pins of a standard clock oscillator shown in FIG. 2c. Three of the four pins of socket 312, namely ENABLE, GROUND and V+ are directly connected to the similarly named holes ENABLE', GROUND' and V+', respectively into which socket 312 is plugged. When a standard clock oscillator is plugged into the socket 312, which itself is then plugged into the original socket holding the standard clock oscillator, a frequency spreading clock oscillator forms. The disclosed packaging makes it possible to improve the EMI for oscillators used today in many electronic systems without any modification to the system.

The present invention has been described in sufficient detail based on several exemplary embodiments. Alternative embodiments will become apparent to those skilled in the art to which the present invention pertains without departing from its spirit and scope. For example, the spreading circuit in the first preferred embodiment of improved oscillating device can be replaced by a low power, low voltage phase-locked-loop frequency modulator. For another example, various delay element array topologies, even programmable topologies can be used in the frequency spreading circuit to achieve any desired modulation pattern. Accordingly, the scope of the present invention is defined by the appended claims rather than the forgoing description of several embodiments.

What is claimed is:

1. A method for reducing radiated electromagnetic emissions from harmonic frequencies of a clock signal having a fundamental frequency F, the method comprising the steps of:

receiving the clock signal having the fundamental frequency F;

determining a frequency offset $\Delta$;

spreading the fundamental frequency F within a range from $F-\Delta$ to $F+\Delta$; and producing a spread clock signal having frequencies alternating in the range of $F-\Delta$ to $F+\Delta$;

wherein the step of determining a frequency offset $\Delta$ further comprises a step of producing a plurality of addresses, each corresponding to one gate in a multiplexer, the gate becoming on when the corresponding address is received.

2. The method as recited in claim 1 wherein the step of spreading the fundamental frequency F within a range from $F-\Delta$ to $F+\Delta$ further comprises:

feeding the clock signal to a delay circuit comprising a plurality of delay groups, each having a different delay;

producing a plurality of versions of the clock signal, each having a different delay after the clock signal passes the corresponding delay groups;

multiplexing the versions of the delayed clock signal based on continuously received addresses produced by the step of producing a plurality of addresses; and outputting a sequence of the multiplexed and delayed clock signal; and thereby the output clock signal has frequencies alternating in the range of $F-\Delta$ to $F+\Delta$.

3. A method for reducing radiated electromagnetic emissions from harmonic frequencies of a clock signal having a fundamental frequency F, the method comprising the steps of:

receiving the clock signal having the fundamental frequency F;

determining a frequency offset $\Delta$;

spreading the fundamental frequency F within a range from $F-\Delta$ to $F+\Delta$;

producing a spread clock signal having frequencies alternating in the range of $F-\Delta$ to $F+\Delta$;

wherein the step of determining a frequency offset $\Delta$ comprises a step of determining a frequency difference between the fundamental frequency F and a predetermined parameter; and wherein the step of spreading the fundamental frequency F within a range of $F-\Delta$ to $F+\Delta$ further comprises the steps of:

providing a charging circuit comprising a constant current source and a multiplexer;

increasing the frequency of the clock signal through the charging circuit when the frequency difference becomes negative; and decreasing the frequency of the clock signal through the charging circuit when the frequency difference becomes positive.

4. An apparatus for reducing radiated electromagnetic emissions from harmonic frequencies of a clock signal having a fundamental frequency F, the apparatus comprising:

means for receiving the clock signal having the fundamental frequency F;

means for determining a frequency offset $\Delta$;

means for spreading the fundamental frequency F within a range from $F-\Delta$ to $F+\Delta$; and means for producing a spread clock signal having frequencies alternating in the range of $F-\Delta$ to $F+\Delta$;

wherein the means for determining a frequency offset $\Delta$ further comprises means for producing a plurality of addresses, each corresponding to one gate in a multiplexer, the gate becoming on when the corresponding address is received.

5. The apparatus as recited in claim 4 wherein the means for spreading the fundamental frequency F within a range from $F-\Delta$ to $F+\Delta$ further comprises:

means for feeding the clock signal to a delay circuit comprising a plurality of delay groups, each having a different delay;

means for producing a plurality of versions of the clock signal, each having a different delay after the clock signal passes the corresponding delay groups;

means for multiplexing the versions of the delayed clock signal based on continuously received addresses produced by the means for producing a plurality of addresses; and means for outputting a sequence of the multiplexed and delayed clock signal; and thereby the output clock signal has frequencies alternating in the range of F−Δ to F+Δ.

6. An apparatus for reducing radiated electromagnetic emissions from harmonic frequencies of a clock signal having a fundamental frequency F, the apparatus comprising:

means for receiving the clock signal having the fundamental frequency F;

means for determining a frequency offset Δ;

means for spreading the fundamental frequency F within a range from F−Δ to F+Δ; and means for producing a spread clock signal having frequencies alternating in the range of F−Δ to F+Δ;

wherein the means for determining a frequency offset Δ comprises means for determining a frequency difference between the fundamental frequency F and a predetermined parameter; and wherein the means for spreading the fundamental frequency F within a range of F−Δ to F+Δ further comprises:

a charging circuit comprising a constant current source and a multiplexer;

means for increasing the frequency of the clock signal through the charging circuit when the frequency difference becomes negative; and means for decreasing the frequency of the clock signal through the charging circuit when the frequency difference becomes positive.

7. An improved oscillating device powered by an external power source, providing a system clocking signal to an electronic system, for reducing electromagnetic emissions therefrom, the oscillating device comprising:

a housing having a first lead and a second lead;

clocking receiving means, housed in the housing, for receiving a clocking signal having a frequency centered at F;

frequency modulating means, responsive to the clocking signal, for electronically modulating the frequency of the clocking signal within a limit around F, the modulated clocking signal being the system clocking signal provided through the first lead of the housing to the electronic system; and wherein said second lead of said housing internally communicates with the clocking receiving means and the frequency modulating means respectively, and externally receives a power-down control signal when the electronic system becomes idle for an excessive period of time.

8. The improved oscillating device as recited in claim 7 wherein the clocking receiving means and the frequency modulating means stop operation upon receiving the power-down control signal from the second lead so that the power consumption therein of the external power becomes minimum.

9. An improved oscillating device powered by an external power source, providing a system clocking signal to an electronic system, for reducing electromagnetic emissions therefrom, the oscillating device comprising:

a housing having a first lead and a second lead;

clocking receiving means, housed in the housing, for receiving a clocking signal having a frequency centered at F, said clocking signal being received from an externally oscillating device through said second lead;

frequency modulating means, responsive to the clocking signal, for electronically modulating the frequency of the clocking signal within a limit around F, the modulated clocking signal being the system clocking signal provided through the first lead of the housing to the electronic system, said frequency modulating means comprising:

means for determining a frequency offset Δ;

means, responsive to the clocking signal from the clocking receiving means, for generating an inherent modulating function bounded by a frequency alternating range F+Δ and F−Δ such that the clocking signal is modulated therein by the inherent modulating function thereby the modulated clocking signal has frequencies spreading around F and bounded between F+Δ and F−Δ; and wherein the modulating means comprises:

means, having a plurality of outputs, for delaying the clocking signal for a number of periods of time, each of the outputs of the delaying means representing the clocking signal being delayed for each particular period of time and each of the outputs having an address;

sequence generating means, responsive to the clocking signal, for generating a sequence of address signals, each corresponding to one of the outputs of the delaying means; and multiplexing means, coupling with the outputs of the delaying means and responsive to the sequence of the address signals, for choosing one of the corresponding outputs for every one of the address signals received.

10. The improved oscillating device as recited in claim 9 wherein the delaying means comprises an array of delay groups, each having an input and an output and each being connected in series, each of the delay groups comprising a plurality of delay elements, each of the delay elements being connected in series, each of the outputs of the delaying means being produced from the output of each of the delay groups, respectively.

11. An improved oscillating device powered by an external power source, providing a system clocking signal to an electronic system, for reducing electromagnetic emissions therefrom, the oscillating device comprising:

a housing having a first lead and a second lead;

clocking receiving means, housed in the housing, comprising an oscillating circuit tuned at F, thereby producing a clocking signal centered at F; and frequency modulating means, responsive to the clocking signal, for electronically modulating the frequency of the clocking signal within a limit around F, the modulated clocking signal being the system clocking signal provided through the first lead of the housing to the electronic system, said frequency modulating means comprising:

means for determining a frequency offset Δ;

modulating means, responsive to the clocking signal from the clocking receiving means, for generating an inherent modulating function bounded by the frequency alternating range F+Δ and F−Δ such that the clocking signal is modulated therein by the inherent modulating function thereby the modulated clocking signal has frequencies spreading around F and bounded between F+Δ and F−Δ;

wherein the modulating means comprises:

means, having a plurality of outputs, for delaying the clocking signal for a number of periods of time, each of the outputs of the delaying means representing the clocking signal being delayed for each particular period of time and each of the outputs having an address;

sequence generating means, responsive to the clocking signal, for generating a sequence of address signals, each corresponding to one of the outputs of the delaying means; and multiplexing means, coupling with the outputs of the delaying means and responsive to the sequence of the address signals, for choosing one of the corresponding outputs for every one of the address signals received.

12. The improved oscillating device as recited in claim 11 wherein the delaying means comprises an array of delay groups, each having an input and an output and each being connected in series, each of the delay groups comprising a plurality of delay elements, each of the delay elements being connected in series, each of the outputs of the delaying means being produced from the output of each of the delay groups, respectively.

13. The improved oscillating device as recited in claim 11 wherein the sequence generating means produces the sequence of the address signals periodically, each of the address signals successively corresponding to the outputs of the delaying means, respectively.

14. The improved oscillating device as recited in claim 11 wherein the sequence generating means produces the sequence of the address signals randomly, each of the address signals corresponding to one of the outputs of the delaying means.

15. A resonating device, being mechanically and functionally compatible with a conventional crystal or ceramic resonator used in a oscillating circuit comprising equivalent inductance and capacitance components, the oscillating circuit in an electronic system, upon being excited, producing an oscillating signal, the resonating device being substitutional to the resonator and comprising:

at least two terminals coupling with the oscillating circuit;

means, through the two terminals, for receiving a voltage applied thereon when the oscillating circuit is excited, wherein the voltage comprises a DC component and an AC component;

a tuning device with a voltage or current sensitive impedance, the impedance varies in accordance with the voltage or current received through the voltage or current receiving means;

means, coupled with the tuning device, for generating a modulated clock signal with varying frequencies between F1 and F2;

an internal resonator oscillating circuit generating a reference oscillating signal with a frequencies F;

means, coupled with the modulating signal generating means, for modulating the equivalent impedance so that the two terminals outputs a oscillating signal with frequencies varying from F−F1 to F+F2.

16. The resonating device as recited in claim 15, wherein the voltage receiving means further comprises:

means for filtering the DC component from the received voltage such that only the AC component of the received voltage passes through the filtering means; and means for rectifying the AC component to produce a DC voltage to support the internal oscillator and the modulating means to operate.

17. The resonating device as recited in claim 16, wherein the filtering means comprises a capacitor through which only the AC component of the received voltage can pass.

18. The resonating device as recited in claim 17 wherein the modulating signal generating means comprises the tuning device, at least one capacitor and one inductor to form a LC resonance circuit to generate the modulated impedance when the received voltage is applied to the modulating signal generating means.

19. The resonating device as recited in claim 18 wherein the signal modulating means comprise:

a frequency spreading circuit receiving the modulated signal from the LC resonance circuit;

means for coupling the primary oscillating signal from the internal resonator oscillating circuit to the frequency spreading circuit;

means for comparing the received modulated signal and the primary oscillating signal;

the frequency of the primary oscillation spread with respect to the comparison in the comparing means.

20. A method for varying the fundamental frequency of a passive resonator when the resonator is used in an oscillating circuit, the method comprising the steps of:

providing an impedance modulating circuit;

receiving a voltage applied onto the impedance modulating circuit, wherein the voltage comprises an AC component and a DC component;

filtering the DC component out of the voltage to make a high DC resistance between the impedance terminals;

rectifying the remained AC component to produce a steady DC voltage;

receiving an oscillating signal from the modulated-impedance circuit;

generating a steady reference clock signal having a fundamental frequency F;

comparing the oscillating signal from the impedance-modulated circuit to the reference clock signal;

determining a frequency spreading offset from the comparison in the step of comparing the oscillating signal from the impedance-modulated circuit to the reference clock signal;

providing a frequency spreading circuit receiving the reference clock signal and the frequency spreading offset;

spreading the frequency F of the reference clock signal between F−A and F+A;

producing a spread clock signal having frequencies in the range of F−A to F+A.

21. The method as recited in claim 20, wherein the impedance-modulated circuit comprises a tuning diode with a variable capacitance, the capacitance varying with the voltage applied across it.

22. The method as recited in claim 21, wherein the capacitance alternating circuit further comprises at least one capacitor and at least one inductor, whereby a LC resonator is established.

23. The method as recited in claim 22, wherein the impedance-modulated circuit comprises a tuning diode with a capacitance sensitive to a voltage applied thereon.

* * * * *